(12) United States Patent
Walters (10) Patent No.: US 10,708,243 B2
(45) Date of Patent: Jul. 7, 2020

(54) MESSAGE ENCRYPTION USING PUBLIC KEYCHAINS

(71) Applicant: Capital One Services, LLC, McLean, VA (US)

(72) Inventor: Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/960,679

(22) Filed: Apr. 24, 2018

(65) Prior Publication Data

US 2019/0327216 A1    Oct. 24, 2019

(51) Int. Cl.
| | |
|---|---|
| *H04L 29/06* | (2006.01) |
| *H04L 9/30* | (2006.01) |
| *H04L 9/08* | (2006.01) |
| *G06F 16/27* | (2019.01) |
| *H04L 9/06* | (2006.01) |

(52) U.S. Cl.
CPC ........ *H04L 63/0442* (2013.01); *H04L 9/0637* (2013.01); *H04L 9/0866* (2013.01); *H04L 9/30* (2013.01); *H04L 63/12* (2013.01); *G06F 16/27* (2019.01)

(58) Field of Classification Search
None
See application file for complete search history.

(56) References Cited

U.S. PATENT DOCUMENTS

| | | | | |
|---|---|---|---|---|
| 7,707,420 | B1* | 4/2010 | Little | H04L 9/3247 380/30 |
| 2003/0007645 | A1* | 1/2003 | Ofir | H04L 63/0442 380/282 |
| 2016/0342994 | A1* | 11/2016 | Davis | G06Q 20/027 |
| 2016/0380937 | A1* | 12/2016 | Murphy | H04L 51/08 709/206 |
| 2017/0180134 | A1* | 6/2017 | King | H04L 9/3247 |
| 2018/0083771 | A1* | 3/2018 | Bonnell | G06F 21/6245 |
| 2018/0097635 | A1* | 4/2018 | Moses | H04L 9/0637 |
| 2018/0137512 | A1* | 5/2018 | Georgiadis | H04L 9/3239 |
| 2018/0159865 | A1* | 6/2018 | Lau | H04L 9/3271 |
| 2018/0181964 | A1* | 6/2018 | Zagarese | G06Q 20/40145 |
| 2018/0183587 | A1* | 6/2018 | Won | G06F 21/44 |
| 2018/0183602 | A1* | 6/2018 | Campagna | H04L 9/3247 |

OTHER PUBLICATIONS

AnyCrypt, A Chrome Extention to Right Encrypt & Decrypt; http://lettergram.github.io/AnyCrypt/; Apr. 23, 2018.

* cited by examiner

*Primary Examiner* — Kambiz Zand
*Assistant Examiner* — Arezoo Sherkat
(74) *Attorney, Agent, or Firm* — DLA Piper LLP (US)

(57) ABSTRACT

To encrypt and distribute a message, a processor of a sender device may determine a public key associated with a recipient identifier. The processor may request confirmation of a the recipient identifier from a central authority server. The processor may receive the confirmation of the recipient identifier from the central authority server. The processor may encrypt the message using the public key to form an encrypted message. The processor may distribute the encrypted message. The encrypted message may be decipherable using a private key associated with the recipient identifier and used by a recipient device to securely interact with the distributed blockchain.

14 Claims, 8 Drawing Sheets

MESSAGE ENCRYPTION USING PUBLIC KEYCHAINS

BACKGROUND

Computing devices often exchange messages with one another over publicly-accessible networks. To keep the messages secure, a sending computer can encrypt a message using a key, and, if a receiving computer also has a key, the receiving computer can decrypt the message.

Encryption may be applied to data other than messages between computing devices. For example, data may be stored in distributed ledgers such as blockchains, where each block in a distributed blockchain includes an immutable and mutually agreed upon record of a transaction. At least a portion of data in one or more blocks can be secured using a public/private key combination.

SUMMARY OF THE DISCLOSURE

Systems and methods described herein may leverage public keychains, such as those available for use with blockchains, in order to encrypt and/or distribute messages between electronic devices.

In one example, a method of encrypting and distributing a message may include determining, by a processor of a sender device, a public key associated with a recipient identifier. The method may include requesting, by the processor, confirmation of the recipient identifier from a central authority server. The method may include receiving, at the processor, the confirmation of the recipient identifier from the central authority server. The method may include encrypting, by the processor, the message using the public key to form an encrypted message. The method may include distributing, by the processor, the encrypted message. The encrypted message may be decipherable using a private key associated with the recipient identifier and used by a recipient device to securely interact with the distributed blockchain.

In some embodiments, the method may include determining, by the processor, at least one additional public key associated with at least one additional recipient identifier. The method may include requesting, by the processor, confirmation of the at least one additional recipient identifier from the central authority server. The method may include receiving, at the processor, the confirmation of the at least one additional recipient identifier from the central authority server. The method may include encrypting, by the processor, the message using the at least one additional public key to form at least one additional encrypted message. The method may include distributing, by the processor, the at least one additional encrypted message. The at least one additional encrypted message may be decipherable using at least one additional private key associated with the at least one additional recipient identifier and used by at least one additional recipient device to securely interact with the distributed blockchain. In some embodiments, the encrypted message and the at least one additional encrypted message may each include a sender identifier, the recipient identifier, and each at least one additional recipient identifier.

In some embodiments, the distributing may include posting the encrypted message in a publicly-accessible computer network, sending the message to the recipient device, adding the message to a block in the distributed blockchain, or a combination thereof.

In some embodiments, the determining may include examining a block of a distributed blockchain to determine the public key.

In some embodiments, the method may include receiving the public key from the central authority server.

In some embodiments, the method may include receiving, at the processor, an encrypted inbound message from a user of an external sender device. The encrypted inbound message may be encrypted using a second public key associated with the user of the sender device. The method may include decrypting, by the processor, the encrypted inbound message using a second private key associated with the sender device and used by the sender device to securely interact with the distributed blockchain. In some embodiments, the external sender device may be associated with the recipient identifier.

In another example, a device configured to securely interact with a distributed blockchain may include a processor, a transceiver in communication with the processor, and a non-transitory memory in communication with the processor. The memory may be configured to store a private key for securely interacting with the distributed blockchain and instructions that, when executed by the processor, cause the processor to perform processing. The processing may include determining a public key associated with a recipient identifier. The processing may include requesting, by the transceiver, confirmation of the recipient identifier from a central authority server. The processing may include receiving, by the transceiver, the confirmation of the recipient identifier from the central authority server. The processing may include encrypting the message using the public key to form an encrypted message. The processing may include distributing the encrypted message. The encrypted message may be decipherable using a recipient private key associated with the recipient identifier and used by a recipient device to securely interact with the distributed blockchain.

In some embodiments, the processing may include determining at least one additional public key associated with at least one additional recipient identifier. The processing may include requesting, by the transceiver, confirmation of the at least one additional recipient identifier from the central authority server. The processing may include receiving, by the transceiver, the confirmation of the at least one additional recipient identifier from the central authority server. The processing may include encrypting the message using the at least one additional public key to form at least one additional encrypted message. The processing may include distributing the at least one additional encrypted message. The at least one additional encrypted message may be decipherable using at least one additional private key associated with the at least one additional recipient identifier and used by at least one additional recipient device to securely interact with the distributed blockchain. In some embodiments, the encrypted message and the at least one additional encrypted message may each include a sender identifier, the recipient identifier, and each at least one additional recipient identifier.

In some embodiments, the distributing may include posting, by the transceiver, the encrypted message in a publicly-accessible computer network, sending, by the transceiver, the message to the recipient device, adding the message to a block in the distributed blockchain, or a combination thereof.

In some embodiments, the determining may include examining a block of a distributed blockchain to determine the public key.

In some embodiments, the processing may include receiving the public key from the central authority server.

In some embodiments, the processing may include receiving, by the transceiver, an encrypted inbound message from a user of an external sender device, the encrypted inbound message being encrypted using a second public key associated with the user of the sender device. The processing may include decrypting the encrypted inbound message using the private key in the memory.

In some embodiments, the memory may be further configured to store at least a portion of the distributed blockchain.

In another example, a central authority server may include a processor, a transceiver in communication with the processor, and a non-transitory memory in communication with the processor. The memory may be configured to store identity records and instructions that, when executed by the processor, cause the processor to perform processing. The processing may include receiving, by the transceiver, a request from a sender device, the request being for confirmation of a recipient identifier from a block of a distributed blockchain. The processing may include searching the identity records to determine whether the associated recipient identifier is valid. The processing may include, in response to determining that the associated recipient identifier is valid, generating a confirmation message. The processing may include sending, by the transceiver, the confirmation message to the sender device. A public key associated with the valid recipient identifier may be used by the sender device to encrypt a message that is decipherable using a private key associated with the recipient identifier and used by a recipient device to securely interact with the distributed blockchain.

In some embodiments, the processing may include receiving, by the transceiver, an encrypted inbound message from a user of an external sender device. The encrypted inbound message may be encrypted using a second public key associated with the central authority server. The processing may include decrypting the encrypted inbound message using a private key in the memory. In some embodiments, the encrypted inbound message may include data effecting a transfer of funds involving an account associated with the recipient identifier.

In some embodiments, the processing may include examining the block of the distributed blockchain to determine the recipient identifier.

DETAILED DESCRIPTION OF SEVERAL EMBODIMENTS

Systems and methods described herein may leverage public keychains, such as those available for use with blockchains, in order to encrypt and/or distribute messages between electronic devices. For example, a block of a blockchain may include public and private data. The public data may include data identifying a party to a transaction recorded in the block, such as a name and/or a public key. The private data may be encrypted using the public key and may be decipherable using a private key held by the same party (e.g., a private key for a virtual wallet with currency whose value is stored in the blockchain). A sending device may obtain a public key associated with a receiving party from a blockchain. The sending device may encrypt a message using the public key and transmit the message. The message may be directly transmitted to the receiving party and/or via a centralized system or authority or added to a block of a distributed blockchain that may be publicly accessible. The message may be decipherable only by a device associated with the receiving party (e.g., a device including or having access to a corresponding private key). In some embodiments, a central authority (e.g., a server) may verify the identity of the receiving party. Because the sending device may have access to all the information it needs to encrypt the message through the blockchain, the central authority may not need to handle the message. In some embodiments, the central authority may sign a public key as being associated with the receiving party (e.g., on a per-message basis or independently of a message for storage within a block of the blockchain). In any case, the disclosed systems and methods may allow direct sharing of messages without a dedicated message server. This may reduce processing load on the central authority server performing identity verifications, because identity verifications may be the server's only task related to the messaging.

Figure 1:
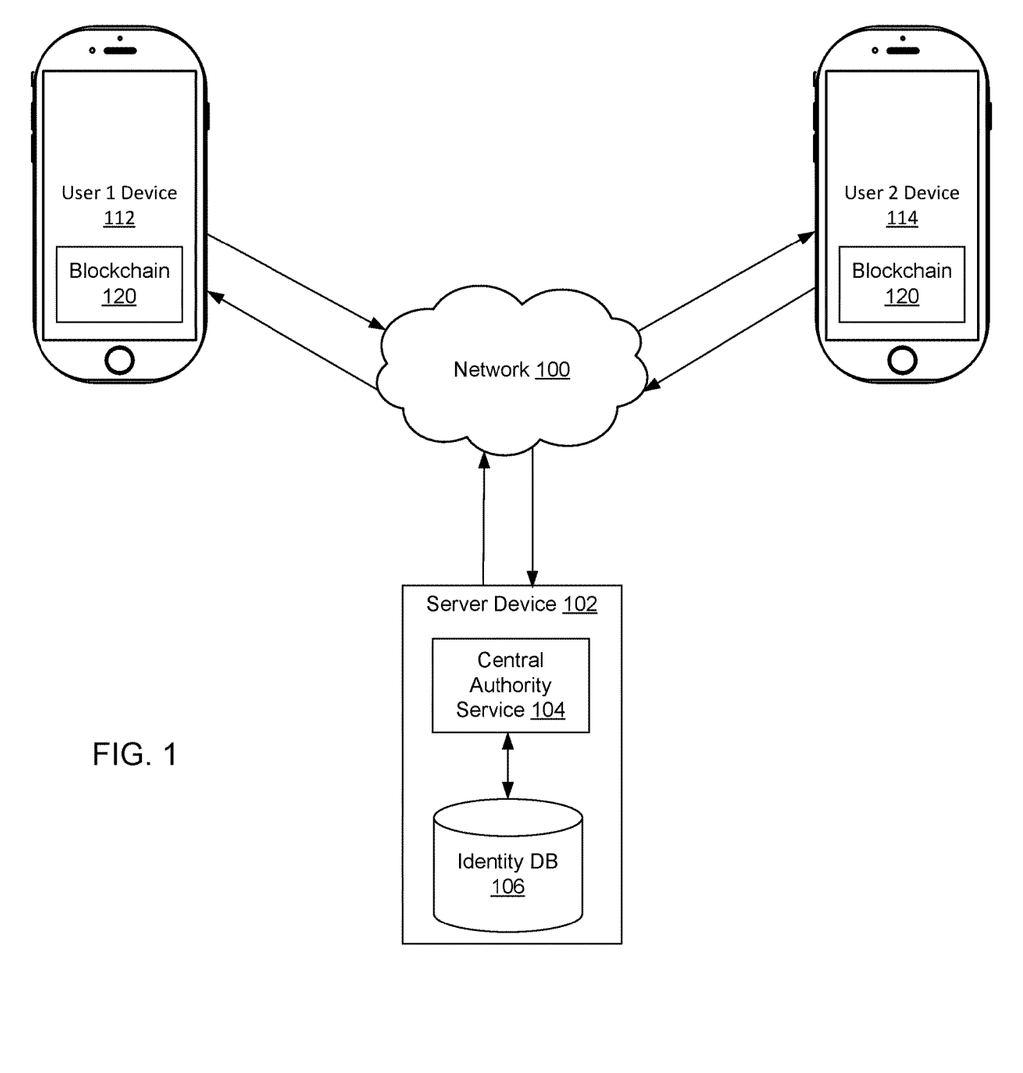
FIG. 1 shows a network including a central authority service and distributed blockchain according to an embodiment of the present disclosure.

FIG. 1 shows a network 100 including a central authority service 104 and distributed blockchain 120 according to an embodiment of the present disclosure. User devices 112/114 may be used for sending and/or receiving messages and/or for performing blockchain-based transactions. In some embodiments, not every user device 112/114 configured to send/receive messages need be configured to also process blockchain 120 data, and/or not every user device 112/114 configured to process blockchain 120 data need be configured to also send/receive messages. User devices 112/114 may be smartphones, tablets, computers, or other device configured to communicate and/or use distributed ledgers (e.g., blockchain 120). User devices 112/114 may communicate with one another and/or with server device 102 by network 100 (e.g., the Internet or another public and/or private network).

In some embodiments, communication between user devices 112/114 may be secured using public/private key data also used to record data in blockchain 120. User devices 112/114 may also add data to, process, store (or partially store), and/or perform other processing related to blockchain 120. For example, blockchain 120 may be a cryptocurrency ledger or other publicly available ledger. At least a portion of the data used to create blocks in blockchain 120 may be encrypted using a public/private key scheme (e.g., parties to a financial transaction recorded in a cryptocurrency ledger may use private keys to cause the creation of a block in the ledger). Because the communications may be secured using the same key set as is used for the blockchain 120, the same central authority may provide not only identity verification services, but also blockchain-related services as may be applicable to blockchain schemes known in the art. At the same time, the existence of a key set outside of the messaging service (i.e., the blockchain 120 key set) may allow the central authority to perform the verification without being otherwise involved with the exchange of communications. For example, messages may need not pass through the central authority, and the messages may be exchanged through any communication channel. This may reduce processing requirements for the central authority and may allow any known or unknown method of communicating between devices 112/114 to be employed.

Server device 102 may be configured to provide a central authority for verifying the identity of an entity that has recorded data in blockchain 120. For example, server device 102 may include central authority service 104, which may be configured to process identity verification requests from user devices 112/114, and identity database 106, which may be configured to store identity data. In some embodiments, central authority service 104 may access blockchain 120 to perform verification (e.g., blockchain 120 may be available or partially available in identity database 106 and/or through network 100). In some embodiments, server device 102 may serve as a central authority both for verifying user identities and for blockchain-related processing. Server device 102 is depicted as a single server including a single central authority service 104 and identity database 106 for ease of illustration, but those of ordinary skill in the art will appreciate that server device 102 may be embodied in different forms for different implementations. For example, server device 102 may include a plurality of servers.

Figure 2:
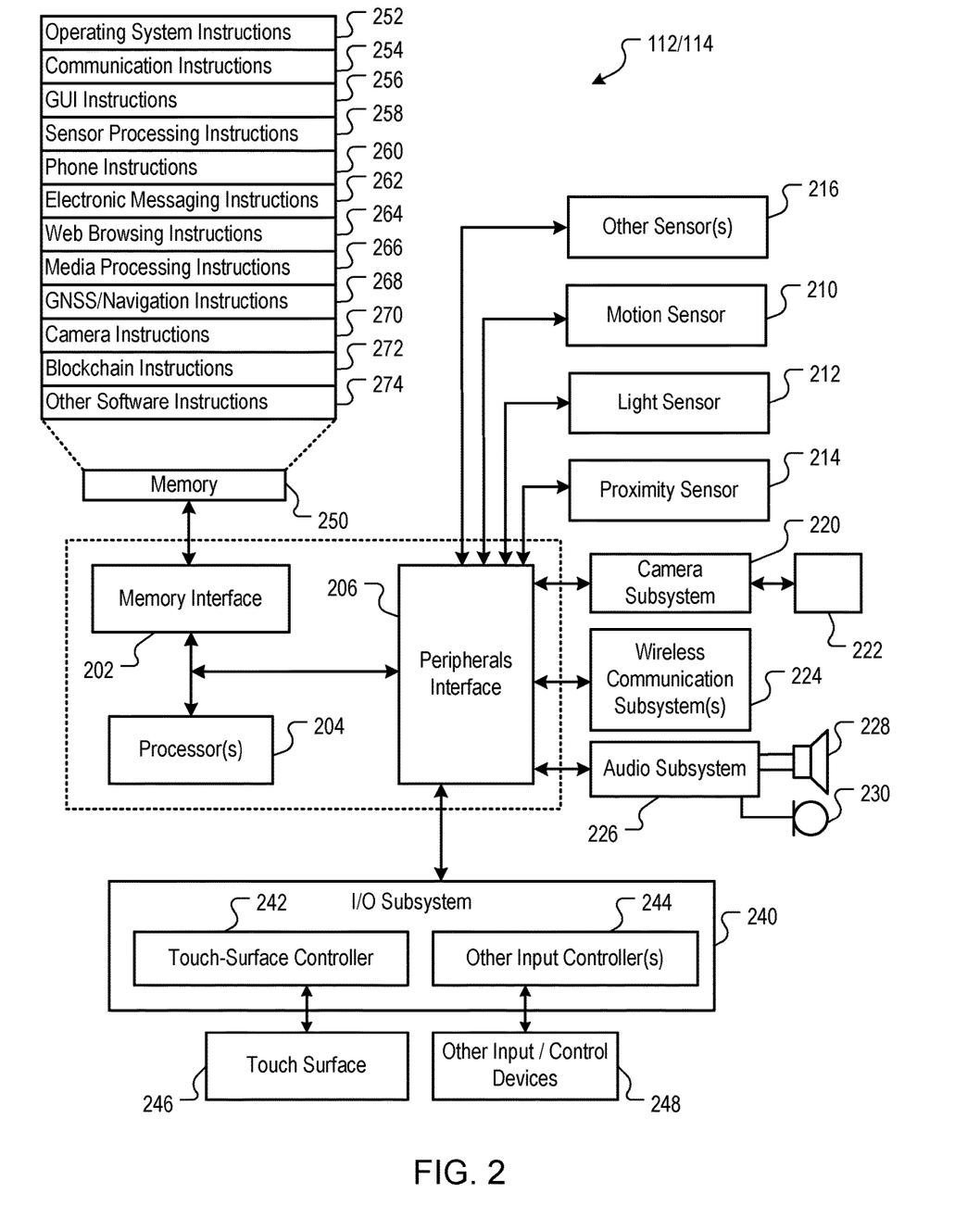
FIG. 2 shows a computing device according to an embodiment of the present disclosure.

FIG. 2 shows a block diagram of an example computing device, for example a computing device configured to function as user device 112 and/or user device 114. For example, user devices 112/114 may exchange messages as described herein. The user device 112/114 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in the user device 112/114 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112/114 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112/114 may present recorded audio and/or video files, such as MP3, AAC, and MPEG files. In some implementations, the user device 112/114 may include the functionality of an MP3 player, such as an iPod™. The user device 112/114 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store blockchain instructions 272 to facilitate other processes and functions, such as performing blockchain-related processing (e.g., transactions) and/or message encryption and/or communication that leverages blockchain data as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112/114 may be implemented in hardware and/or in software, including in one or more signal processing and/or application specific integrated circuits.

Figure 3:
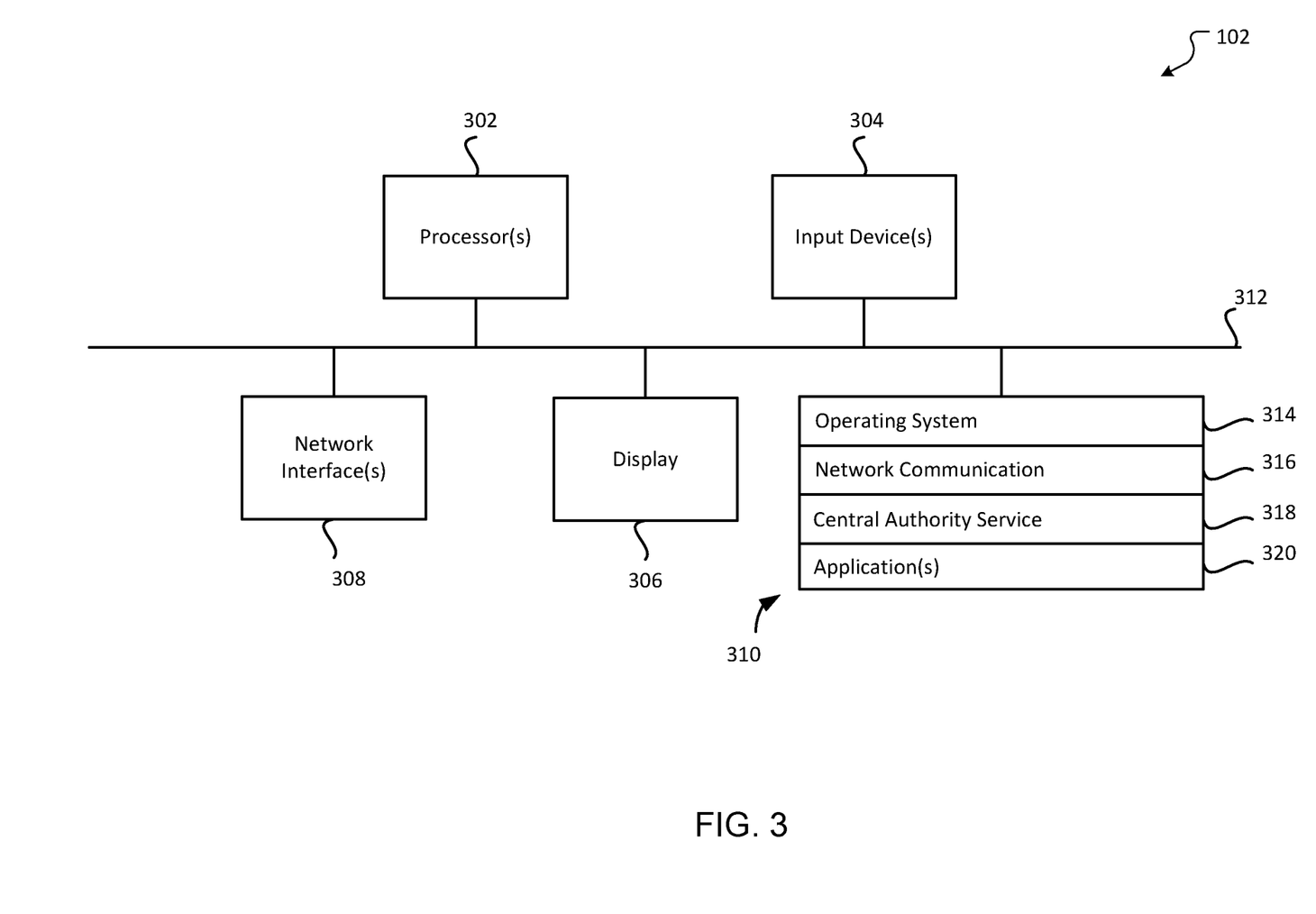
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Central authority service instructions 318 can include instructions that confirm message party identities as described herein. In some embodiments, central authority service instructions 318 may provide verification of blockchain-based identities without performing blockchain-related processing and/or other message-related processing, thereby minimizing an amount of processing performed by server device 102 for message exchange between user devices 112.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4A:
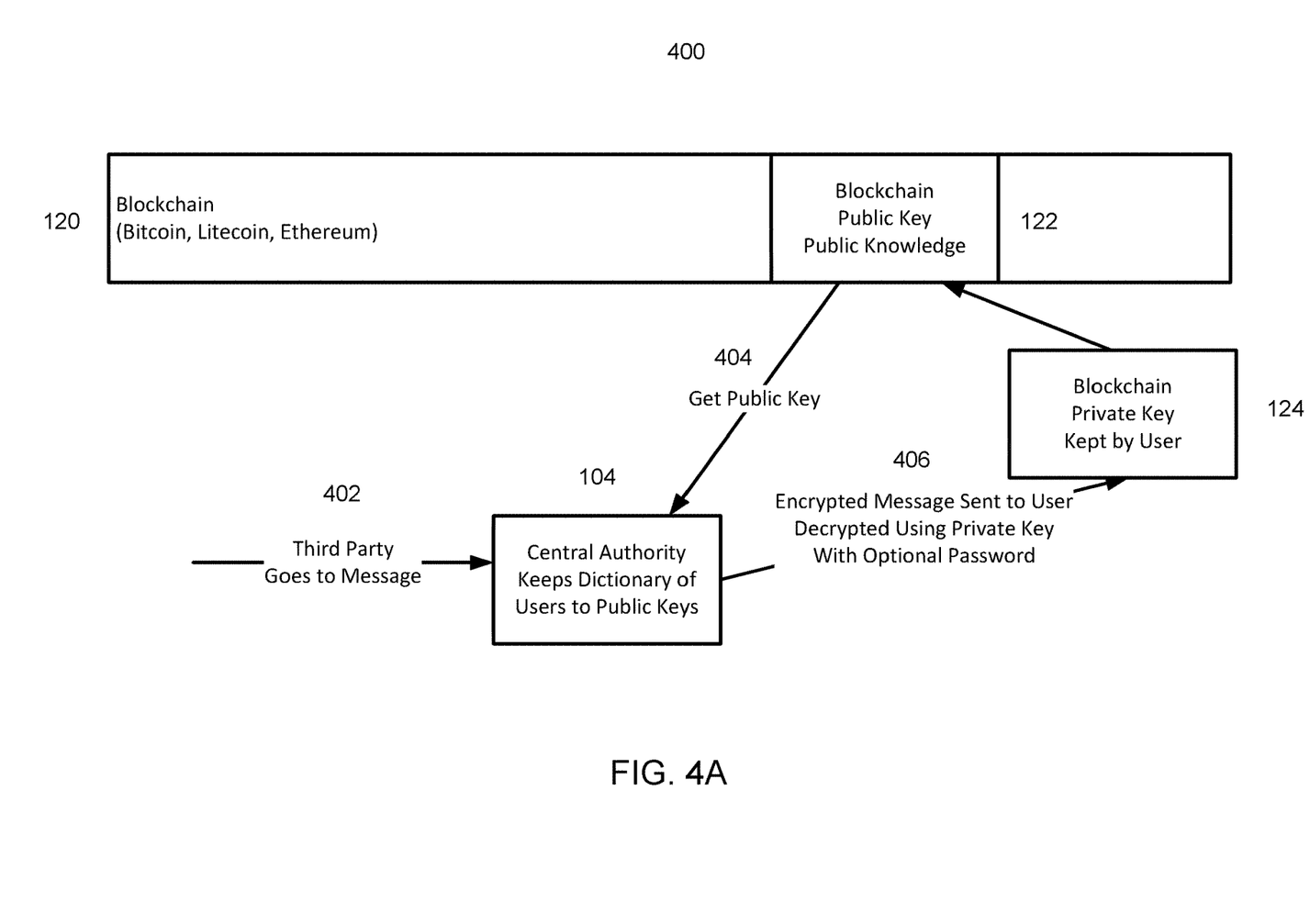
FIG. 4A shows a message encryption and sharing process according to an embodiment of the present disclosure.

FIG. 4A shows a message encryption and sharing process 400 according to an embodiment of the present disclosure. Process 400 may be performed by one or more elements shown in FIG. 1, such as a first user device that may send a message (sending user device 112), a second user device that may receive a message (receiving user device 114), a central authority (server device 102), and network 100 that may facilitate communications between the other elements.

At 402, sending user device 112 may prepare a message for transmission to a recipient and may check with server device 102 to verify the recipient's identity (this process is explained in greater detail with respect to FIG. 5 below). Central authority service 104 of server device 102 may maintain identity database 106 containing a dictionary of users to public keys. For example, identity database may include user identifying information allowing central authority service 104 to locate a user described in the message and identify their key.

At 404, central authority service 104 may verify the key for the recipient. For example, central authority service 104 may inspect publicly-accessible blockchain 120 to identify a block 122 that has recorded a transaction involving the recipient (e.g., containing the recipient's public key). Central authority service 104 may get the public key from block 122 and verify that it matches the user's key as expected based on the message and/or the data in identity database 106 (this process is explained in greater detail with respect to FIG. 6 below). Central authority service 104 may inform sending user device 112 of the verification and/or may deliver the message to receiving user device 114 in some embodiments. The message may be encrypted using the public key.

At 406, the recipient may receive the message through receiving user device 114 (this process is explained in greater detail with respect to FIG. 7 below). Receiving user device 114 may have access to the recipient's private key 124 for accessing block 122. Receiving user device 114 may use the recipient's private key to decrypt the message.

Figure 4B:
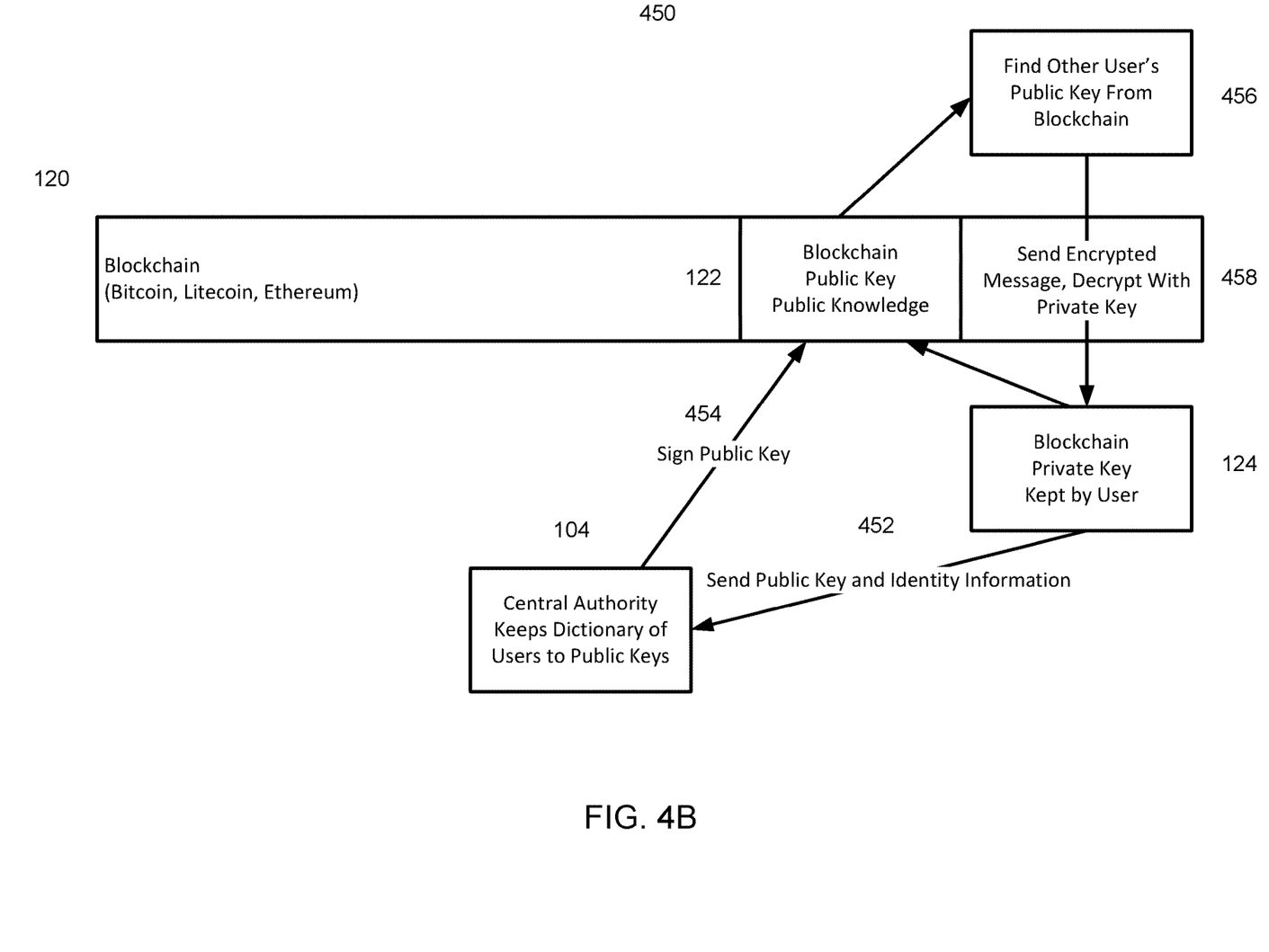
FIG. 4B shows a message encryption and sharing process according to an embodiment of the present disclosure.

FIG. 4B shows a message encryption and sharing process according to an embodiment of the present disclosure. Process 450 may be performed by one or more elements shown in FIG. 1, such as a first user device that may send a message (sending user device 112), a second user device that may receive a message (receiving user device 114), a central authority (server device 102), and network 100 that may facilitate communications between the other elements. Process 450 may be an alternate process to process 400. In some embodiments, sending user device 112, receiving user device 114, and/or server device 102 may be configured to perform process 400 and/or 450.

At 452, receiving user device 114, which may have access to the recipient's private key 124 for accessing block 122, may send public key and identity information to central authority service 104. For example, receiving user device 114 may send the public key and identity information as part of a registration process to be able to receive messages, as part of a registration process to be able to use blockchain 120, and/or in other contexts. Central authority service 104 may store the public key and identity information in identity database 106, for example.

At 454, central authority service 104 may sign the key for the recipient. For example, central authority service 104 may add block 122 including a signature indicating that the public key is verified as belonging to the recipient. For example, central authority service 104 may verify the public key using process 600 of FIG. 6, described below, or some other verification process, and sign the public key as verified. This may verify that the key in block 122 matches the user's key as expected based on the message and/or the data in identity database 106.

Signatures may be revocable. For example, if central authority service 104 is notified of the recipient's account being compromised, central authority service 104 may record a revocation of the signature in blockchain 120 and/or a digital signature may be revoked according to other techniques known in the relevant art. Also, in some embodiments, signatures may be reverified and/or resigned periodically (e.g., updated at the start of user access sessions such as in response to user login and/or at given time intervals). In this case, signatures may be automatically revoked at the end of a user session (e.g., in response to user logoff) and/or after the lapse of a time interval. To reverify and/or resign the signatures later, process 450 may be repeated.

At 456, sending user device 112 may prepare a message for transmission to a recipient and may check blockchain 120 to verify the recipient's identity (this process is explained in greater detail with respect to FIG. 5 below). For example, sending user device 112 may find block 122 in blockchain 120 containing the signature indicating that the public key is verified as belonging to the recipient. Sending user device 112 may encrypt the message, for example using the public key signed by central authority service 104 from block 122.

At 458, the recipient may receive the message through receiving user device 114 (this process is explained in greater detail with respect to FIG. 7 below). In the example of FIG. 4B, the message is placed in a block of blockchain 120, and receiving user device 114 may retrieve the message from blockchain 120. However, the message may be delivered from sending user device 112 to receiving user device 114 by any communication method (e.g., text, Facebook chat, Slack, Instagram, Whatsapp, as a message along with a money transfer, etc.). Receiving user device 114 may have access to the recipient's private key for accessing block 122. Receiving user device 114 may use the recipient's private key to decrypt the message.

Figure 5:
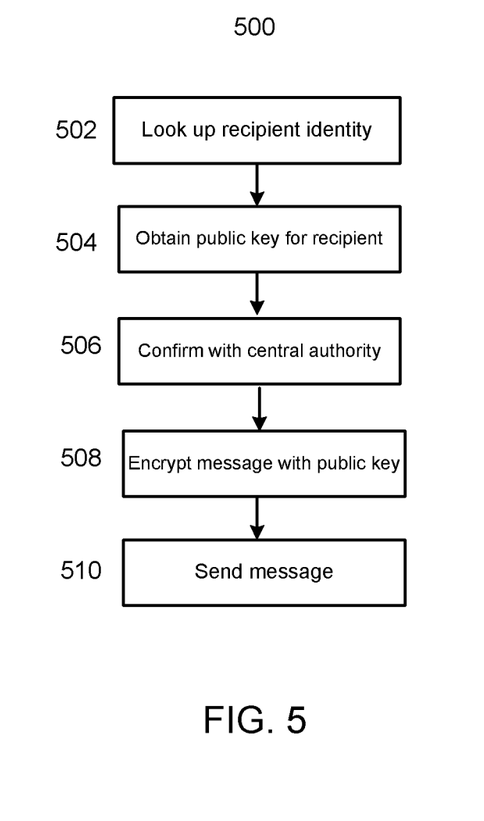
FIG. 5 shows a message encryption and sending process according to an embodiment of the present disclosure.

FIG. 5 shows a message encryption and sending process 500 according to an embodiment of the present disclosure. Sending user device 112 may perform process 500 to determine a message recipient, obtain and/or confirm a public key for the message recipient, encrypt a message using the public key, and distribute the encrypted message, for example.

At 502, user device 112 may determine a recipient identity. For example, the creator of the message (e.g., a user of user device 112) may enter identifying information into user device 112 via a user interface. For example, the identifying information may include name, user name, email address, phone number, public key for blockchain 120, and/or other information.

At 504, user device 112 may obtain a public key for the recipient, for example by inspecting blockchain 120 for a block recording a transaction involving the recipient and finding the public key therein. In some embodiments, this step may be omitted, as identity verification process 600, described below, may provide the public key as part of the verification process.

Figure 6:
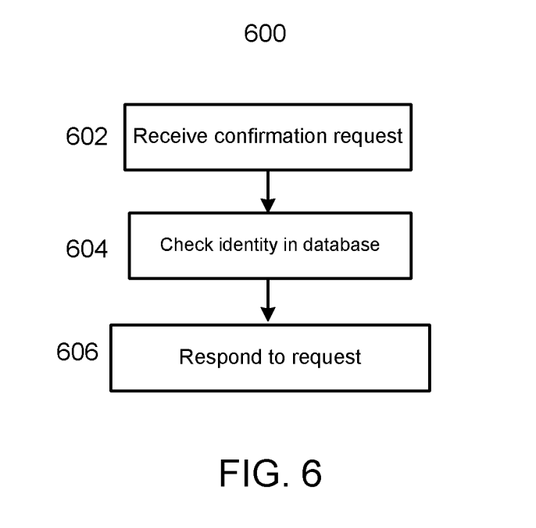
FIG. 6 shows an identity verification process according to an embodiment of the present disclosure.

At 506, user device 112 may verify the identity of the recipient. For example, as shown in process 400, user device 112 may communicate with the central authority (e.g., server device 102) to verify the identity of the recipient. For example, server device 102 may perform process 600 and verify the identity. Server device 102 may communicate that the identity has been verified. In some embodiments, the communication may include the public key useable to encrypt the message. The message may be decipherable only by a recipient computing device having access to a corresponding private key. If server device 102 cannot verify the identity, server device 102 may return an error, and process 500 may end. In this example, user device 112 may request verification for each message sent.

In another example, as shown in process 450, user device 112 may inspect blockchain 120 for a public key of the recipient that has been signed by the central authority (e.g., server device 102). In some embodiments, this signed key may be in a block including a recorded transaction involving the recipient. In some embodiments, the signed key may be in a different block inserted into blockchain 120 by server device 102.

At 508, user device 112 may encrypt the message using the public key. Accordingly, the message may be decipherable only to a user and/or device who has the private key associated with the public key.

At 510, user device 112 may distribute the encrypted message. In some embodiments, distributing the encrypted message may include transmitting the message from sending user device 112 to receiving user device 114 by any communication method. In some embodiments, distributing the encrypted message may include a public or private posting of the message (e.g., the message may be posted, encrypted, on a webpage, in a block of a blockchain, or in some other location accessible to user device 114).

Process 500 is presented in the context of preparing a message for a single recipient in the preceding example. However, in some embodiments, group messages for plural recipients may be prepared according to the same process 500. In such embodiments, user device 112 may perform 502-510 for each recipient separately. Each encrypted message may include a sender identifier, the recipient identifier, and each recipient identifier for all other recipients in the group. Accordingly, recipients may know each recipient who received the message and, if they wish to respond, may include all members of the group in a response.

FIG. 6 shows an identity verification process 600 according to an embodiment of the present disclosure. Server device 102 may perform process 600 to verify the identity of a user for which a message is intended. For example, central authority service 104 may use data in identity database 106 to verify an identity.

At 602, server device 102 may receive a confirmation request from sending user device 112. For example, as shown in process 400, the confirmation request may include information identifying the intended recipient of a message. The information may have been obtained by sending user device 112 from blockchain 120 and/or by a user entering the information through a user interface at user device 112 as described above.

In another example, as shown in process 450, the confirmation request may be provided from receiving user device 114. For example, receiving user device 114 may request signing of its public key as part of a registration process.

At 604, server device 102 may verify the recipient. For example, as shown in process 400, identity database 106 may include stored identity information. The stored identity information may include a plurality of records. Each record may be for a specific individual and may include one or more pieces of identifying information. For example, the identifying information may include name, user name, email address, phone number, public key for blockchain 120, and/or other information.

Central authority service 104 may analyze the request to identify intended recipient information in the request (e.g., name, user name, email address, phone number, public key for blockchain 120, and/or other information) and search identity database 106 for an entry that includes at least partially matching information. For example, if the request includes a user name for the recipient, central authority service 104 may find an entry in identity database 106 including the user name.

Central authority service 104 may use data from the entry in identity database 106 to verify the identity. For example, the entry may include the recipient's public key. Central authority service 104 may inspect blockchain 120 to find one or more blocks formed using the recipient's public key and confirm that the recipient was in fact a party to one or more transactions recorded in the one or more blocks. For example, central authority service 104 may act as a central authority for both the identity verification and blockchain 120 (e.g., as a financial institution processing the transactions recorded therein). Accordingly, central authority service 104 may have access to transaction data in its capacity as central authority for blockchain 120 and may use this transaction data to confirm that the recipient was a party to one or more transactions recorded in the one or more blocks. This may confirm that the intended recipient from the request is the recipient who uses the expected public key.

If central authority service 104 does not find a matching entry in identity database 106 or cannot verify the identity with blockchain 120, central authority service 104 may determine that there is an error and the intended recipient cannot be reached. In some cases, the lack of entry may be due to a lack of registration by the intended recipient, for example. In other cases, the recipient identity's validity may have been revoked (e.g., if central authority service 104 is informed of a compromise to a recipient's private key security by due to lost wallet and/or if central authority service 104 receives a customer request and/or notice of wallet deactivation, etc.). Central authority service 104 may remove the revoked identity data from identity database 106 and/or move the revoked identity data to a portion of identity database 106 including revoked accounts (e.g., which may not be searched at 604). In some embodiments, central authority service 104 may notify user device 112 of the revocation.

In another example, such as that of process 450, central authority service 104 may verify the identity by signing the public key and indicating within blockchain 120 that the public key has been signed by the central authority. For example, central authority service 104 may act as a central authority for both the identity verification and blockchain 120 (e.g., as a financial institution processing the transactions recorded therein). Accordingly, central authority service 104 may sign the public key as part of its transaction processing. In other embodiments, because central authority service 104 may act as a central authority for blockchain 120, central authority service 104 may issue the keys themselves and may sign the keys at the time of issuance. In this example, process 600 may end at this point, because the identity may be verified, and the verification may be securely memorialized within blockchain 120. Central authority service 104 may have no further role in processing messages, and, as described above, sending user device 112 may receive verification directly from blockchain 120 by finding the signed key.

For examples such as that described in process 400, at 606, server device 102 may respond to the request. For example, if central authority service 104 successfully verified the identity in the request at 604, server device 102 may send a message to sending user device 112 indicating that the recipient has been verified. In some embodiments, the message may include identity information from identity database 106 (e.g., identity information that was not in the request). In some embodiments, the request may include the message itself, and server device 102 may send and/or post the message for receipt by receiving user device 114.

If central authority service 104 did not successfully verify the identity in the request at 604, server device 102 may send a message to sending user device 112 indicating that the recipient was not found or not verified. For example, user device 112 performing process 500 may attempt to confirm the identity in 506 and may wait for confirmation before encrypting the message in 508 and distributing the message in 510. In the case wherein server device 102 indicates that the recipient was not found or not verified, user device 112 may be unable to encrypt and send the message as described above.

Figure 7:
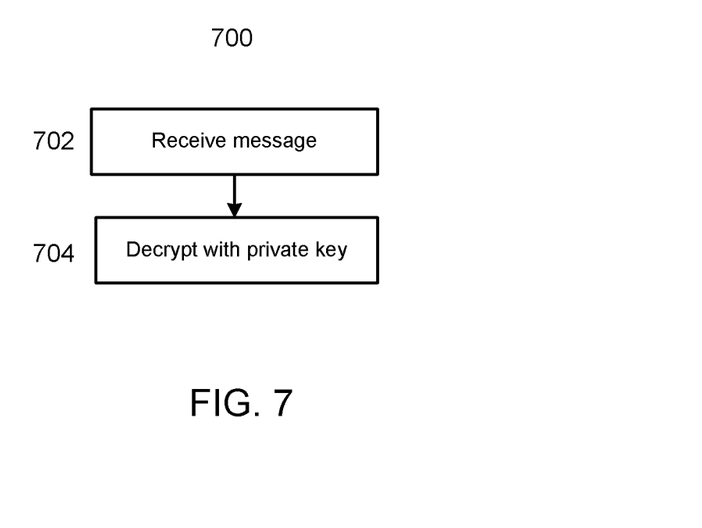
FIG. 7 shows a message receipt process according to an embodiment of the present disclosure.

FIG. 7 shows a message receipt process 700 according to an embodiment of the present disclosure. Receiving user device 114 may perform process 700 to obtain and/or handle a message generated and sent as described above, for example.

At 702, user device 114 may receive the message. For example, the message may be transmitted to user device 114 through network 100 or some other network (e.g., by email, SMS, MMS, chat message, or other transmission method). In another example, user device 114 may obtain the message from a public or private posting of the message (e.g., the message may be posted, encrypted, on a webpage, in a block of a blockchain, or in some other location accessible to user device 114).

At 704, user device 114 may decrypt the message. As described above, the message may have been encrypted using a public key. User device 114 may have a private key corresponding to the public key in a local memory and/or a user may input the private key through a user interface. User device 114 may use the private key to decrypt the message. Once decrypted, the message may be processed by user device 114. For example, user device 114 may display the message, execute instructions contained within the message, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of encrypting and delivering a message, the method comprising:
   requesting, by a processor of a sender device, a recipient identifier from a central authority server;
   receiving, at the processor, a confirmation of the recipient identifier from the central authority server, the confirmation including a signed recipient identifier determined by the central authority server in response to the requesting;
   identifying, by the processor, a public key associated with the signed recipient identifier within a distributed blockchain;

encrypting, by the processor, the message using a public key associated with the recipient identifier to form an encrypted message, wherein the encrypted message is decipherable using a private key associated with the recipient identifier and used by a recipient device to securely interact with the distributed blockchain;

sending, by the processor, the encrypted message as an email or text message sent to an address of an account accessible by a user associated with an external device by at least one network;

receiving, at the processor, an encrypted inbound message from the external device, the encrypted inbound message being encrypted using a second public key associated with a user of the sender device;

decrypting, by the processor, the encrypted inbound message using a second private key associated with the user of the sender device; and decrypting, by the processor, at least one block of the distributed blockchain using the second private key.

2. The method of claim 1, further comprising:

determining, by the processor, at least one additional public key associated with at least one additional recipient identifier;

requesting, by the processor, confirmation of the at least one additional recipient identifier from the central authority server;

receiving, at the processor, the confirmation of the at least one additional recipient identifier from the central authority server;

encrypting, by the processor, the message using the at least one additional public key to form at least one additional encrypted message; and distributing, by the processor, the at least one additional encrypted message, wherein the at least one additional encrypted message is decipherable using at least one additional private key associated with the at least one additional recipient identifier and used by at least one additional recipient device to securely interact with the distributed blockchain.

3. The method of claim 2, wherein the encrypted message and the at least one additional encrypted message each include a sender identifier, the recipient identifier, and each at least one additional recipient identifier.

4. The method of claim 1, wherein the external device is associated with the recipient identifier.

5. A device configured to securely communicate with other devices, the device comprising:

a processor;

a transceiver in communication with the processor; and a non-transitory memory in communication with the processor and configured to store a private key for securely interacting with the distributed blockchain and instructions that, when executed by the processor, cause the processor to perform processing comprising:

requesting, by the transceiver, a recipient identifier from a central authority server;

receiving, by the transceiver, a confirmation of the recipient identifier from the central authority server, the confirmation including a signed recipient identifier determined by the central authority server in response to the requesting;

identifying a public key associated with the signed recipient identifier within a distributed blockchain;

encrypting the message using a public key associated with the recipient identifier to form an encrypted message, wherein the encrypted message is decipherable using a recipient private key associated with the recipient identifier and used by a recipient device to securely interact with the distributed blockchain;

sending, by the transceiver, the encrypted message as an email or text message sent to an address of an account accessible by a user associated with an external device by at least one network;

receiving, by the transceiver, an encrypted inbound message from a user of the external device, the encrypted inbound message being encrypted using a second public key associated with the user of the sender device;

decrypting the encrypted inbound message using the private key in the memory; and decrypting at least one block of the distributed blockchain using the second private key.

6. The device of claim 5, wherein the processing further comprises:

determining at least one additional public key associated with at least one additional recipient identifier;

requesting, by the transceiver, confirmation of the at least one additional recipient identifier from the central authority server;

receiving, by the transceiver, the confirmation of the at least one additional recipient identifier from the central authority server;

encrypting the message using the at least one additional public key to form at least one additional encrypted message; and distributing the at least one additional encrypted message, wherein the at least one additional encrypted message is decipherable using at least one additional private key associated with the at least one additional recipient identifier and used by at least one additional recipient device to securely interact with the distributed blockchain.

7. The device of claim 6, wherein the encrypted message and the at least one additional encrypted message each include a sender identifier, the recipient identifier, and each at least one additional recipient identifier.

8. The device of claim 5, wherein the memory is further configured to store at least a portion of the distributed blockchain.

9. The method of claim 1, wherein the decrypted at least one block of the distributed blockchain includes data recording a transaction.

10. The method of claim 1, further comprising extracting, by the processor, the public key from a block of the distributed blockchain.

11. The device of claim 5, wherein the decrypted at least one block of the distributed blockchain includes data recording a transaction.

12. The device of claim 5, wherein the processing further comprises extracting the public key from a block of the distributed blockchain.

13. The method of claim 9, further comprising performing processing, by the processor, to facilitate the transaction.

14. The device of claim 11, wherein the processing further comprises performing processing to facilitate the transaction.

* * * * *